US012624202B2

(12) United States Patent
Lee et al.

(10) Patent No.: US 12,624,202 B2
(45) Date of Patent: May 12, 2026

(54) THERMOPLASTIC RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Eunji Lee, Daejeon (KR); Bong Keun Ahn, Daejeon (KR); Min Jung Kim, Daejeon (KR); Jangwon Park, Daejeon (KR); Jiyoon Jeon, Daejeon (KR); Seyong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 659 days.

(21) Appl. No.: 18/016,282

(22) PCT Filed: Aug. 1, 2022

(86) PCT No.: PCT/KR2022/011314
§ 371 (c)(1),
(2) Date: Jan. 13, 2023

(87) PCT Pub. No.: WO2023/068498
PCT Pub. Date: Apr. 27, 2023

(65) Prior Publication Data
US 2024/0279455 A1 Aug. 22, 2024

(30) Foreign Application Priority Data
Oct. 22, 2021 (KR) ........................ 10-2021-0141873
Jul. 27, 2022 (KR) ........................ 10-2022-0093138

(51) Int. Cl.
*C08L 33/12* (2006.01)
*C08F 220/14* (2006.01)
*C08F 265/04* (2006.01)
*C08F 285/00* (2006.01)
*C08L 51/04* (2006.01)

(52) U.S. Cl.
CPC ............... *C08L 33/12* (2013.01); *C08L 51/04* (2013.01); *C08F 220/14* (2013.01); *C08F 265/04* (2013.01); *C08F 285/00* (2013.01); *C08L 2205/025* (2013.01); *C08L 2205/03* (2013.01)

(58) Field of Classification Search
CPC .................. C08F 212/08; C08F 220/14; C08F 220/1804; C08F 220/44; C08F 220/52; C08F 222/40; C08F 265/04; C08F 285/00; C08L 2205/025; C08L 2205/03; C08L 33/10; C08L 33/12; C08L 51/04
See application file for complete search history.

(56) References Cited

U.S. PATENT DOCUMENTS

| | | | |
|---|---|---|---|
| 2007/0287799 A1 | 12/2007 | Ha et al. | |
| 2013/0281603 A1 | 10/2013 | Jin et al. | |
| 2014/0235749 A1 | 8/2014 | Kim et al. | |
| 2022/0041783 A1 | 2/2022 | Kim et al. | |
| 2022/0056183 A1 | 2/2022 | Kim et al. | |
| 2022/0073723 A1 | 3/2022 | Ahn et al. | |
| 2022/0073724 A1 | 3/2022 | Kim et al. | |

FOREIGN PATENT DOCUMENTS

| | | | |
|---|---|---|---|
| CN | 103764700 | A | 4/2014 |
| CN | 113227247 | A | 8/2021 |
| EP | 3882285 | A1 | 9/2021 |
| KR | 10-2006-0118156 | A | 11/2006 |
| KR | 10-2007-0117315 | A | 12/2007 |
| KR | 10-0823495 | B1 | 4/2008 |
| KR | 10-2012-0078583 | A | 7/2012 |
| KR | 10-2013-0071156 | A | 6/2013 |
| KR | 10-1333578 | B1 | 11/2013 |
| KR | 10-1478027 | B1 | 12/2014 |
| KR | 10-2015-0067746 | A | 6/2015 |
| KR | 10-1697393 | B1 | 2/2017 |
| KR | 10-1760987 | B1 | 7/2017 |
| KR | 10-2021-0026668 | A | 3/2021 |
| KR | 10-2021-0027089 | A | 3/2021 |
| KR | 10-2021-0052081 | A | 5/2021 |
| KR | 10-2021-0087171 | A | 7/2021 |
| WO | 2021/118063 | A1 | 6/2021 |

OTHER PUBLICATIONS

Chinese Office Action issued Jan. 2, 2024 for counterpart Chinese Patent Application No. 202280006184.5 Note: KR 2021-0087171 A was cited in a prior IDS.
Extended European Search Report issued Jan. 5, 2024 for counterpart European Patent Application No. 22834829.8 Note: KR 2015-0067746 A was cited in a prior IDS.
International Search Report and Written Opinion issued in corresponding International Patent Application No. PCT/KR2022/011314, dated Nov. 7, 2022.

*Primary Examiner* — Ana L. Woodward
(74) *Attorney, Agent, or Firm* — Morgan, Lewis & Bockius LLP

(57) ABSTRACT

A thermoplastic resin composition including an alkyl (meth) acrylate-aromatic vinyl compound-vinyl cyanide compound graft copolymer (A) including a polymer seed including 70 to 85% by weight of an alkyl (meth)acrylate and 15 to 30% by weight of an aromatic vinyl compound, a rubber core surrounding the polymer seed and including 78 to 90% by weight of an alkyl acrylate and 10 to 22% by weight of an aromatic vinyl compound, and a graft shell surrounding the rubber core and including 65 to 80% by weight of an aromatic vinyl compound, 14 to 25% by weight of a vinyl cyanide compound, and 3 to 15% by weight of an alkyl acrylate; and a non-graft copolymer (B) including an alkyl (meth)acrylate, an aromatic vinyl compound, a vinyl cyanide compound, and an imide-based compound. The present disclosure also relates to a preparation method and a molded article.

20 Claims, No Drawings

THERMOPLASTIC RESIN COMPOSITION, METHOD OF PREPARING THE SAME, AND MOLDED ARTICLE MANUFACTURED USING THE SAME

CROSS-REFERENCE TO RELATED APPLICATIONS

This application claims priority to Korean Patent Application No. 10-2021-0141873, filed on Oct. 22, 2021, and Korean Patent Application No. 10-2022-0093138, re-filed on Jul. 27, 2022, based on the priority of the above patent, in the Korean Intellectual Property Office, the disclosures of each of which are incorporated herein by reference.

TECHNICAL FIELD

The present invention relates to a thermoplastic resin composition, a method of preparing the same, and a molded article manufactured using the same. More particularly, the present invention relates to a thermoplastic resin composition having excellent transparency, gloss, heat resistance, weather resistance, and impact resistance prepared by adjusting the composition and composition ratio of each layer of a graft copolymer having a structure consisting of a polymer seed, a rubber core surrounding the seed, and a graft shell surrounding the core, adjusting the morphology of the rubber core, and adjusting the refractive index difference with a matrix polymer; a method of preparing the thermoplastic resin composition; and a molded article manufactured using the thermoplastic resin composition.

BACKGROUND ART

Acrylate-styrene-acrylonitrile graft copolymers (hereinafter referred to as "ASA resins") do not contain an unstable double bond, and thus have very excellent weather resistance. Accordingly, ASA resins are widely used in various fields such as electric/electronic parts, building materials (e.g., vinyl siding, etc.), extrusion profiles, and automobile parts. In recent years, in the field of outdoor products, market demand for high value-added products having properties such as unpainted, transparent, high chroma, and special color is continuously increasing.

To impart transparency to a graft copolymer including a rubber core, the refractive indexes of the rubber core, a graft shell, and a matrix resin should be similar to each other. In addition, in a resin composition including a graft copolymer and a matrix resin, when the difference in refractive index between a rubber core and the matrix resin is small, refraction and reflection of light do not occur at the interface of the graft copolymer, so that the resin composition becomes transparent.

In the case of an ASA resin including a butyl acrylate rubber core and a styrene-acrylonitrile copolymer shell, the refractive index of the butyl acrylate rubber is 1.46, and the refractive index of the styrene-acrylonitrile copolymer is 1.56 to 1.58. Due to the large difference in refractive index between the core and the shell, the resin is opaque. In addition, when an ASA resin is prepared using a styrene-acrylonitrile copolymer (hereinafter referred to as "SAN resin") as a matrix resin, due to the large difference in refractive index between the SAN resin (refractive index: 1.56 to 1.58) and the core of the ASA resin, the resin composition is opaque.

Therefore, it is necessary to develop a resin composition having excellent gloss, heat resistance, weather resistance, and mechanical properties while realizing transparency by reducing the difference between the refractive index of each of a seed, a core, and a shell constituting an ASA resin and the refractive index of a matrix resin.

RELATED ART DOCUMENTS

Patent Documents

KR 2006-0118156 A

DISCLOSURE

Technical Problem

Therefore, the present invention has been made in view of the above problems, and it is one object of the present invention to provide a thermoplastic resin composition having excellent transparency, gloss, heat resistance, weather resistance, and impact resistance, a method of preparing the same, and a molded article manufactured using the same.

The above and other objects can be accomplished by the present invention described below.

Technical Solution

In accordance with one aspect of the present invention, provided is a thermoplastic resin composition including an alkyl (meth)acrylate-aromatic vinyl compound-vinyl cyanide compound graft copolymer (A) including a polymer seed including 70 to 85% by weight of an alkyl (meth) acrylate and 15 to 30% by weight of an aromatic vinyl compound, a rubber core surrounding the polymer seed and including 78 to 90% by weight of an alkyl acrylate and 10 to 22% by weight of an aromatic vinyl compound, and a graft shell surrounding the rubber core and including 65 to 80% by weight of an aromatic vinyl compound, 14 to 25% by weight of a vinyl cyanide compound, and 3 to 15% by weight of an alkyl acrylate; and a non-graft copolymer (B) including an alkyl (meth)acrylate, an aromatic vinyl compound, a vinyl cyanide compound, and an imide-based compound, wherein the graft copolymer (A) satisfies both Equations 1 and 2 below:

$$200 \leq 2*r2 \leq 300 \quad \text{[Equation 1]}$$

$$25 \leq r2 - r1 \leq 45, \quad \text{[Equation 2]}$$

wherein r1 represents an average radius (nm) from a center of the graft copolymer to the seed, and r2 represents an average radius (nm) from the center of the graft copolymer to the core.

In the graft copolymer (A), a difference between a refractive index of the rubber core and a refractive index ($\mu_D^{25}$) of the graft shell may be preferably 0.08 to 0.09.

A difference between a refractive index of the polymer seed of the graft copolymer (A) and a refractive index ($\mu_D^{25}$) of the non-graft copolymer (B) may be preferably 0.007 or less.

Based on 100% by weight in total of the graft copolymer (A), the graft copolymer (A) may include preferably 5 to 35% by weight of the polymer seed, 25 to 55% by weight of the rubber core, and 25 to 55% by weight of the graft shell.

The non-graft copolymer (B) may include preferably 60 to 90% by weight of an alkyl (meth)acrylate, 3 to 33% by weight of an aromatic vinyl compound, 0.1 to 20% by weight of a vinyl cyanide compound, and 0.1 to 20% by weight of an imide-based compound.

In the non-graft copolymer (B), the imide-based compound may include preferably one or more selected from the group consisting of N-phenylmaleimide, maleimide, N-methylmaleimide, N-ethylmaleimide, N-propylmaleimide, N-butylmaleimide, N-isobutylmaleimide, N-cyclohexylmaleimide, and N-benzylmaleimide.

The thermoplastic resin composition may include preferably 10 to 90% by weight of the graft copolymer (A) and 10 to 90% by weight of the non-graft copolymer (B).

The thermoplastic resin composition may include preferably an alkyl acrylate-aromatic vinyl compound-vinyl cyanide compound graft copolymer (C) containing a rubber core having an average particle diameter of 50 to 150 nm.

When acetone is added to the thermoplastic resin composition, stirring and centrifugation are performed to obtain an insoluble gel and a soluble sol, and then refractive indexes thereof are measured, a difference between a refractive index of the sol and a refractive index ($\mu_D^{25}$) of the gel may be preferably 0.005 or less.

The thermoplastic resin composition may have preferably a haze of 5% or less as measured using an injection specimen having a thickness of 3 mm according to ASTM D1003.

The thermoplastic resin composition may have preferably a gloss of 115 or more as measured at 45° using an injection specimen having a thickness of 3 mm according to ASTM D2457.

The thermoplastic resin composition may have preferably an Izod impact strength of 11 kgf·cm/cm or more as measured at room temperature using a specimen having a thickness of ¼" according to ASTM D256.

In accordance with another aspect of the present invention, provided is a method of preparing a thermoplastic resin composition, the method including a step of kneading and extruding, at 180 to 300° C. and 80 to 400 rpm, an alkyl (meth)acrylate-aromatic vinyl compound-vinyl cyanide compound graft copolymer (A) including a polymer seed including 70 to 85% by weight of an alkyl (meth)acrylate and 15 to 30% by weight of an aromatic vinyl compound, a rubber core surrounding the polymer seed and including 78 to 90% by weight of an alkyl acrylate and 10 to 22% by weight of an aromatic vinyl compound, and a graft shell surrounding the rubber core and including 65 to 80% by weight of an aromatic vinyl compound, 14 to 25% by weight of a vinyl cyanide compound, and 3 to 15% by weight of an alkyl acrylate; and a non-graft copolymer (B) including an alkyl (meth)acrylate, an aromatic vinyl compound, a vinyl cyanide compound, and an imide-based compound, wherein the graft copolymer (A) satisfies both Equations 1 and 2 below:

$$200 \le 2 * r2 \le 300 \quad \text{[Equation 1]}$$

$$25 \le r2 - r1 \le 45, \quad \text{[Equation 2]}$$

wherein r1 represents an average radius (nm) from a center of the graft copolymer to the seed, and r2 represents an average radius (nm) from the center of the graft copolymer to the core.

In the step of kneading and extruding, an alkyl acrylate-aromatic vinyl compound-vinyl cyanide compound graft copolymer (C) containing a rubber core having an average particle diameter of 50 to 150 nm may be preferably included.

In accordance with yet another aspect of the present invention, provided is a molded article including the thermoplastic resin composition.

Advantageous Effects

The present invention has an effect of providing a thermoplastic resin composition having excellent transparency, gloss, heat resistance, weather resistance, and impact resistance, a method of preparing the same, and a molded article manufactured using the same.

In addition, the thermoplastic resin composition of the present invention can be applied to automotive interior materials, automotive exterior materials, building materials, home appliances, or medical parts requiring high transparency, gloss, heat resistance, and weather resistance. In this case, an aesthetically pleasing appearance and excellent impact resistance can be realized.

[Forms of Implementation]

Hereinafter, a thermoplastic resin composition, a method of preparing the same, and a molded article manufactured using the same according to the present invention will be described in detail.

The present inventors confirmed that, when the composition and composition ratio of a seed, a core, and a shell constituting an ASA resin were adjusted within a predetermined range to improve the transparency, gloss, heat resistance, weather resistance, and impact resistance of a thermoplastic resin composition including the ASA resin and a matrix resin, and the refractive index difference with the matrix resin was reduced, impact resistance was excellent, and transparency, gloss, heat resistance, and heat resistance were greatly improved. Based on these results, the present inventors conducted further studies to complete the present invention.

The thermoplastic resin composition of the present invention includes an alkyl (meth)acrylate-aromatic vinyl compound-vinyl cyanide compound graft copolymer (A) including a polymer seed including 70 to 85% by weight of an alkyl (meth)acrylate and 15 to 30% by weight of an aromatic vinyl compound, a rubber core surrounding the polymer seed and including 78 to 90% by weight of an alkyl acrylate and 10 to 22% by weight of an aromatic vinyl compound, and a graft shell surrounding the rubber core and including 65 to 80% by weight of an aromatic vinyl compound, 14 to 25% by weight of a vinyl cyanide compound, and 3 to 15% by weight of an alkyl acrylate; and a non-graft copolymer (B) including an alkyl (meth)acrylate, an aromatic vinyl compound, a vinyl cyanide compound, and an imide-based compound, wherein the graft copolymer (A) satisfies both Equations 1 and 2 below. In this case, transparency, gloss, heat resistance, weather resistance, and impact resistance may be excellent.

$$200 \le 2 * r2 \le 300 \quad \text{[Equation 1]}$$

$$25 \le r2 - r1 \le 45 \quad \text{[Equation 2]}$$

In Equations 1 and 2, r1 represents an average radius (nm) from the center of the graft copolymer to the polymer seed, and r2 represents an average radius (nm) from the center of the graft copolymer to the core.

Hereinafter, each component of the thermoplastic resin composition of the present invention will be described in detail.

(A) Alkyl (Meth)Acrylate-Aromatic Vinyl Compound-Vinyl Cyanide Compound Graft Copolymer For example, the graft copolymer (A) may include a polymer seed including 70 to 85% by weight of an alkyl (meth)acrylate and 15 to 30% by weight of an aromatic vinyl compound, a rubber core surrounding the polymer seed and including 78 to 90% by weight of an alkyl acrylate and 10 to 22% by weight of an aromatic vinyl compound, and a graft shell surrounding the rubber core and including 65 to 80% by weight of an aromatic vinyl compound, 14 to 25% by weight of a vinyl cyanide compound, and 3 to 15% by weight of an alkyl acrylate. In this case, transparency, gloss, weather resistance, and impact resistance may be excellent, and compatibility with the non-graft copolymer (B) may be excellent due to the alkyl acrylate contained in the graft shell.

Seed

For example, the polymer seed of the graft copolymer (A) may be prepared by polymerizing 70 to 85% by weight of an alkyl (meth)acrylate and 15 to 30% by weight of an aromatic vinyl compound, preferably 70 to 82% by weight of an alkyl (meth)acrylate and 18 to 30% by weight of an aromatic vinyl compound, more preferably 70 to 80% by weight of an alkyl (meth)acrylate and 20 to 30% by weight of an aromatic vinyl compound. In this case, by reducing the difference in refractive index with the non-graft copolymer (B), transparency, gloss, and weather resistance may be excellent.

For example, the polymer seed of the graft copolymer (A) may have an average particle diameter of 120 to 220 nm, preferably 150 to 190 nm. Within this range, impact resistance, fluidity, and transparency may be imparted to a finally prepared thermoplastic resin composition.

In the present disclosure, the average particle diameters of the polymer seed, rubber core, and graft shell of the graft copolymer may be measured by a measurement method commonly used in the art to which the present invention pertains using electron microscopy, such as SEM and TEM, without particular limitation. For example, for each of the polymer seed, the rubber core, and the graft shell, upon completion of preparation thereof, a sample is obtained, and the average particle diameter of the sample is measured by dynamic light scattering. Specifically, the average particle diameter may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz, and is placed in a glass tube. Then, the average particle diameter of the sample is measured using a flow cell in auto-dilution in a measurement mode of dynamic light scattering/intensity 300 KHz/intensity-weight Gaussian analysis. At this time, setting values are as follows: temperature: 23° C. and measurement wavelength: 632.8 nm.

For example, the difference between the refractive index of the polymer seed of the graft copolymer (A) and the refractive index ($\mu_D^{25}$) of the non-graft copolymer (B) may be 0.007 or less, preferably 0.005 or less, more preferably 0.003 or less. Within this range, transparency and gloss may be realized, and impact resistance may be excellent.

Rubber Core

For example, the rubber core of the graft copolymer (A) may surround the polymer seed and may be prepared by polymerizing 78 to 90% by weight of an alkyl acrylate and 10 to 22% by weight of an aromatic vinyl compound, preferably 80 to 90% by weight of an alkyl acrylate and 10 to 20% by weight of an aromatic vinyl compound, more preferably 82 to 88% by weight of an alkyl acrylate and 12 to 18% by weight of an aromatic vinyl compound. In this case, physical property balance, impact resistance, transparency, gloss, and weather resistance may be excellent.

For example, the rubber core may have an average particle diameter of 200 to 300 nm, preferably 220 to 280 nm, more preferably 230 to 260 nm. Within this range, physical property balance and impact resistance may be excellent.

Graft Shell

For example, the graft shell of the graft copolymer (A) may surround the rubber core and may be prepared by polymerizing 65 to 80% by weight of an aromatic vinyl compound, 14 to 25% by weight of a vinyl cyanide compound, and 3 to 15% by weight of an alkyl acrylate, preferably 67 to 77% by weight of an aromatic vinyl compound, 14 to 22% by weight of a vinyl cyanide compound, and 5 to 12% by weight of an alkyl acrylate, more preferably 70 to 75% by weight of an aromatic vinyl compound, 17 to 22% by weight of a vinyl cyanide compound, and 5 to 10% by weight of an alkyl acrylate. In this case, due to the alkyl acrylate contained in the graft shell, compatibility with the non-graft copolymer (B) may be excellent, and thus physical property balance, transparency, gloss, and weather resistance may be excellent.

For example, the difference between the refractive index of the rubber core of the graft copolymer (A) and the refractive index ($\mu_D^{25}$) of the graft shell may be 0.08 to 0.09, preferably 0.081 to 0.089, more preferably 0.082 to 0.088. Within this range, transparency, gloss, weather resistance, and impact resistance may be excellent.

In the present disclosure, for example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably styrene.

In the present disclosure, for example, the vinyl cyanide compound may include one or more selected from the group consisting of acrylonitrile, methacrylonitrile, ethylacrylonitrile, and isopropylacrylonitrile, preferably acrylonitrile.

In the present disclosure, the alkyl (meth)acrylate may be defined to include both an alkyl acrylate and an alkyl methacrylate.

In the present disclosure, for example, the alkyl acrylate may be an alkyl acrylate containing an alkyl group having 1 to 15 carbon atoms or may include preferably one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate, more preferably an alkyl acrylate containing an alkyl group having 1 to 4 carbon atoms, still more preferably n-butylacrylate, 2-ethylhexyl acrylate, or a mixture thereof.

In the present disclosure, for example, the alkyl methacrylate may be an alkyl methacrylate containing an alkyl group having 1 to 15 carbon atoms or may include preferably one or more selected from the group consisting of methyl methacrylate, ethyl methacrylate, butyl methacrylate, 2-ethylbutyl methacrylate, 2-ethylhexyl methacrylate, and lauryl methacrylate, more preferably an alkyl methacrylate containing an alkyl group having 1 to 4 carbon atoms, still more preferably methyl methacrylate.

(A) Graft Copolymer

For example, the graft copolymer (A) satisfies both Equations 1 and 2 below. In this case, since the thickness of the core of the graft copolymer (A) having a large difference in refractive index with the non-graft copolymer (B) is reduced, transparency, gloss, and impact resistance may be excellent.

$$200 \leq 2*r2 \leq 300 \quad \text{[Equation 1]}$$

$$25 \leq r2 - r1 \leq 45 \quad \text{[Equation 2]}$$

In Equations 1 and 2, r1 represents an average radius (nm) from the center of the graft copolymer to the polymer seed, and r2 represents an average radius (nm) from the center of the graft copolymer to the core.

Equation 1 may be preferably 220≤2*r2≤280, more preferably 230≤2*r2≤260. Within this range, impact resistance may be excellent.

Equation 2 may be preferably 30≤r2−r1≤40, more preferably 32≤r2−r1≤37. Within this range, transparency may be excellent.

r1 may be a value obtained by dividing the average particle diameter of the seed by 2, and r2 may be a value obtained by dividing the average particle diameter of the seed-containing core by 2.

r2−r1 means the thickness of the rubber core. As the thickness of the rubber core decreases, the transmittance of light increases, thereby improving transparency.

In the present disclosure, the refractive index of each of the polymer seed, rubber core, and graft shell of the graft copolymer and the refractive index of the non-graft copolymer (B) may be calculated by Equation 3 below.

$$RI = \sum Wti * RIi \quad \text{[Equation 3]}$$

Wti=Weight fraction (%) of each component of copolymer

RIi=Refractive index of polymer of each component of copolymer

In the present disclosure, the refractive index of each component of the copolymer, i.e., the refractive index of the polymer of a monomer, may be a value generally known in the art to which the present invention pertains. For example, methyl methacrylate may have a refractive index of 1.49, butyl acrylate may have a refractive index of 1.46, styrene may have a refractive index of 1.592, and acrylonitrile may have a refractive index of 1.52.

For example, the graft copolymer (A) may have a gel content of 70 to 98% by weight, preferably 80 to 95% by weight, more preferably 82 to 92% by weight. Within this range, mechanical properties such as impact resistance may be excellent.

For example, the graft copolymer (A) may have a swelling index of 2.5 to 10, preferably 3 to 6, more preferably 3.5 to 5. Within this range, mechanical properties, such as impact resistance, and weather resistance may be excellent.

For example, the graft copolymer (A) may have a grafting degree of 30% or more, preferably 35 to 70%, more preferably 35 to 60%. Within this range, mechanical properties, such as impact resistance, and weather resistance may be excellent.

In the present disclosure, when measuring gel content, swelling index, and grafting degree, 30 g of acetone is added to 0.5 g of a powdered graft copolymer, agitation is performed at 210 rpm and room temperature for 12 hours using a shaker (SKC-6075, Lab Companion Co.), centrifugation is performed at 18,000 rpm and 0° C. for 3 hours using a centrifuge (Supra R30, Hanil Science Co.) to separate only insoluble matter that is not dissolved in acetone, and the separated insoluble matter is dried via forced circulation at 85° C. for 12 hours using an oven (OF-12GW, Lab Companion Co.). Then, the weight of the dried insoluble matter is measured, and gel content, swelling index, and grafting degree are calculated by Equations 4, 5, and 6 below.

$$\text{Gel content (wt \%)} = [\text{Weight (g) of insoluble matter (gel)/Weight (g) of sample}] \times 100 \quad \text{[Equation 4]}$$

$$\text{Swelling index} = \text{Weight (g) of insoluble matter before drying after centrifugation/Weight (g) of insoluble matter after drying after centrifugation} \quad \text{[Equation 5]}$$

$$\text{Grafting degree (\%)} = [\text{Weight (g) of grafted monomers/Rubber weight (g)}] \times 100 \quad \text{[Equation 6]}$$

In Equation 6, the weight (g) of grafted monomers is obtained by subtracting rubber weight (g) from the weight (g) of insoluble matter (gel) obtained by dissolving a graft copolymer in acetone and performing centrifugation, and the rubber weight (g) is the weight (g) of rubber components theoretically added to graft copolymer powder.

For example, based on 100% by weight in total of the graft copolymer (A), the graft copolymer (A) may include the polymer seed in an amount of 5 to 35% by weight, preferably 10 to 30% by weight, more preferably 15 to 25% by weight. Within this range, impact resistance and physical property balance may be excellent. When the content of the polymer seed is less than the range, transparency may be reduced. When the content of the polymer seed exceeds the range, impact resistance may be reduced.

For example, based on 100% by weight in total of the graft copolymer (A), the graft copolymer (A) may include the rubber core in an amount of 25 to 55% by weight, preferably 30 to 50% by weight, more preferably 35 to 45% by weight. Within this range, impact resistance and physical property balance may be excellent. When the content of the rubber core is less than the range, the impact absorbing effect of the graft copolymer may be reduced due to insufficient rubber content. When the content of the rubber core exceeds the range, due to insufficient graft shell content, rubber may agglomerate during coagulation. In addition, the compatibility with the non-graft copolymer (B) may be significantly reduced. As a result, the impact absorbing effect of the graft copolymer may be reduced, and a desired level of refractive index may not be obtained.

For example, based on 100% by weight in total of the graft copolymer (A), the graft copolymer (A) may include the graft shell in an amount of 25 to 55% by weight, preferably 30 to 50% by weight, more preferably 35 to 45% by weight. Within this range, impact resistance and physical property balance may be excellent. When the content of the graft shell is less than the range, due to low grafting efficiency, rubber may agglomerate, which reduces the compatibility with the non-graft copolymer (B) and reduces the impact absorbing effect of the graft copolymer. When an excess of the graft shell is included, due to a decrease in the relative content of rubber, the impact absorbing efficiency may be reduced.

For example, the rubber core may be an acrylic rubber prepared by polymerizing an alkyl acrylate, an aromatic vinyl compound, and a crosslinking agent. When the crosslinking agent is included, a gel content may be adjusted, and impact resistance may be excellent.

For example, the polymer seed, the rubber core, or both may include one or more selected from the group consisting of divinylbenzene, 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethylene glycol diacrylate, ethylene glycol dimethacrylate, diethylene glycol dimethacrylate, triethylene glycol dimethacrylate, neopentyl glycol dimethacrylate, triaryl isocyanurate, triarylamine, diallylamine, and a compound represented by Chemical Formula 1 below as the crosslinking agent.

[Chemical Formula 1]

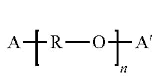

In Chemical Formula 1, A is independently a substituent having a vinyl group, or a (meth)acrylate group, A' is a hydrogen group, a substituent having a vinyl group, an alkyl group having 1 to 30 carbon atoms, an allylalkyl group having 5 to 24 carbon atoms, an arylamine group having 5 to 24 carbon atoms, or an allyl group having 6 to 30 carbon atoms, R is independently a divalent ethyl group or a propyl group, and n is an integer of 0 to 15, preferably 0 to 5, more preferably 0 to 4.

For example, based on 100 parts by weight in total of monomers used in the preparation of each of the polymer seed, rubber core, and graft shell of the graft copolymer (A), the crosslinking agent is included in an amount of 0.001 to 3 parts by weight, preferably 0.05 to 1 part by weight for each preparation.

In the present disclosure, the content of a monomer in a polymer may mean a content (% by weight) of the monomer fed when the polymer is prepared, or may mean a value (% by weight) calculated by converting a unit in the polymer into the monomer.

For example, a method of preparing the graft copolymer (A) may include step (i) of preparing a polymer seed by including 70 to 85% by weight of an alkyl (meth)acrylate and 15 to 30% by weight of an aromatic vinyl compound; step (ii) of preparing a rubber core by including 78 to 90% by weight of an alkyl acrylate and 10 to 22% by weight of an aromatic vinyl compound in the presence of the polymer seed; and step (iii) of preparing a graft copolymer by graft-polymerizing 65 to 80% by weight of an aromatic vinyl compound, 14 to 25% by weight of a vinyl cyanide compound, and 3 to 15% by weight of an alkyl acrylate in the presence of the rubber core. In this case, transparency, gloss, weather resistance, and impact resistance may be excellent.

The method of preparing the graft copolymer (A) may preferably include step (i) of preparing a polymer seed by including 70 to 85% by weight of an alkyl (meth)acrylate, 15 to 30% by weight of an aromatic vinyl compound, an electrolyte, a crosslinking agent, an initiator, and an emulsifier; step (ii) of preparing a rubber core by including 78 to 90% by weight of an alkyl acrylate, 10 to 22% by weight of an aromatic vinyl compound, a crosslinking agent, an initiator, and an emulsifier in the presence of the polymer seed; and step (iii) of preparing a graft copolymer by graft-polymerizing 65 to 80% by weight of an aromatic vinyl compound, 14 to 25% by weight of a vinyl cyanide compound, 3 to 15% by weight of an alkyl acrylate, a crosslinking agent, an initiator, and an emulsifier in the presence of the rubber core. In this case, transparency, gloss, weather resistance, and impact resistance may be excellent.

In steps (i), (ii), and (iii), emulsifiers commonly used in the art to which the present invention pertains may be used as the emulsifier without particular limitation. For example, one or more selected from the group consisting of an alkyl sulfosuccinate metal salt having 12 to 18 carbon atoms or a derivative thereof, an alkyl sulfuric acid ester having 12 to 20 carbon atoms or a derivative thereof, an alkyl sulfonic acid metal salt having 12 to 20 carbon atoms or a derivative thereof, fatty acid soap, and rosin acid soap may be used as the emulsifier.

The alkyl sulfosuccinate metal salt having 12 to 18 carbon atoms or the derivative thereof may include preferably one or more selected from the group consisting of dicyclohexyl sulfosuccinate, dihexyl sulfosuccinate, di-2-ethyl hexyl sulfosuccinate sodium salt, di-2-ethyl hexyl sulfosuccinate potassium salt, dioctyl sulfosuccinate sodium salt, and dioctyl sulfosuccinate potassium salt.

The alkyl sulfuric acid ester having 12 to 20 carbon atoms or the derivative thereof and the alkyl sulfonic acid metal salt having 12 to 20 carbon atoms or the derivative thereof may include preferably one or more selected from the group consisting of sodium lauryl sulfate, sodium dodecyl sulfate, sodium dodecyl benzene sulfate, sodium octadecyl sulfate, sodium oleic sulfate, potassium dodecyl sulfate, and potassium octadecyl sulfate.

The fatty acid soap may include preferably one or more selected from the group consisting of sodium or potassium salts of oleic acid, stearic acid, lauric acid, and mixed fatty acids.

The rosin acid soap may be preferably abietic acid salt.

For example, based on 100 parts by weight in total of monomers used in the preparation of each of the polymer seed, rubber core, and graft shell of the graft copolymer (A), the emulsifier may be included in an amount of 0.01 to 5 parts by weight, preferably 0.1 to 4 parts by weight, more preferably 1 to 3 parts by weight for each preparation.

In steps (i), (ii), and (iii), the type of the initiator is not particularly limited, but a radical initiator may be preferably used.

For example, the radical initiator may include one or more selected from the group consisting of inorganic peroxides, organic peroxides, peroxyketal-based peroxides, peroxycarbonate peroxides, and azo compounds.

The inorganic peroxides may include preferably one or more selected from the group consisting of sodium persulfate, potassium persulfate, ammonium persulfate, potassium superphosphate, and hydrogen peroxide.

The organic peroxides may include one or more selected from the group consisting of t-butyl peroxide, cumene hydroperoxide, p-menthane hydroperoxide, di-t-butyl peroxide, dicumyl peroxide, t-butylcumyl peroxide, 2,5-dimethyl-2,5-di(t-butylperoxy)-hexane, di-t-amyl peroxide, 1,1-di(t-butylperoxy)-3,3,5-trimethylcyclohexane, 1,1-di(t-butylperoxy)-cyclohexane, 1,1-di(t-amylperoxy)-cyclohexane, ethyl 3,3-di(t-amylperoxy)-butyrate, diisopropylbenzene mono-hydroperoxide, t-amyl hydroperoxide, t-butyl hydroperoxide, t-butyl peroxyneodecanoate, t-butyl peroxypivalate, di-(3,3,5-trimethylhexanoyl)-peroxide, t-butylperoxy-2-ethylhexanoate, t-butylperoxy-3,3,5-trimethylhexanoyl, t-amyl peroxy neodecanoate, t-amyl peroxy pivalate, t-amyl peroxy-2-ethylhexanoate, t-butyl peroxyacetate, t-butyl peroxybenzoate, t-amyl peroxy 2-ethylhexyl carbonate, t-butyl peroxy 2-ethylhexyl carbonate, t-butyl peroxy isopropyl monocarbonate, t-butyl peroxy maleic acid, cumyl peroxyneodecanoate, 1,1,3,3,-tetramethylbutylperoxy neodecanoate, 1,1,3,3,-tetramethylbutylperoxy 2-ethylhexanoate, di-2-2-ethylhexyl peroxydicarbonate, 3-hydroxy-1,1-dimethylbutyl peroxyneodecanoate, acetyl peroxide, isobutyl peroxide, octanoyl peroxide, dibenzoyl peroxide, dilauroyl peroxide, 3,5,5-trimethylhexanol peroxide, and t-butylperoxy isobutyrate.

The peroxyketal-based peroxides may include preferably one or more selected from the group consisting of 1,1-di(t-butylperoxy)-3,3,5-trimethylcyclohexane, 1,1-di(t-butylperoxy)cyclohexane, 1,1-di(t-amylperoxy)cyclohexane, ethyl-3,3-di(t-butylperoxy) butyrate, and ethyl-3,3-di(t-amylperoxy) butyrate.

The peroxycarbonate peroxides may include preferably one or more selected from the group consisting of dialkyl peroxides such as dicumyl peroxide, di(t-butylperoxy)-m/p-diisopropylbenzene, 2,5-dimethyl-2,5-(t-butylperoxy) hexane, t-butylcumyl peroxide, and 2,5-methyl-2,5-(t-butylperoxy) hexyne-3, t-butylperoxy 2-ethylhexyl monocarbonate, and t-butyl peroxybenzoate.

The azo compounds may include preferably one or more selected from the group consisting of azobis isobutyronitrile, azobis-2,4-dimethylvaleronitrile, azobis cyclohexanecarbonitrile, and azobis isobutyric acid methyl.

In at least one of steps (i), (ii), and (iii), to promote the initiation reaction for peroxides, an activator may be used, preferably in combination with the polymerization initiator.

Activators commonly used in the art to which the present invention pertains may be used as the activator of the present invention without particular limitation.

Based on 100 parts by weight in total of the graft copolymer, the activator may be included in an amount of 0.01 to 3 parts by weight, preferably 0.01 to 1 part by weight. Within this range, a high degree of polymerization may be realized.

For example, in steps (i), (ii), and (iii), an oxidation-reduction catalyst may be used in combination with the initiator to further promote initiation reaction.

For example, the oxidation-reduction catalyst may include one or more selected from the group consisting of sodium pyrophosphate, dextrose, ferrous sulfide, sodium sulfite, sodium formaldehyde sulfoxylate, and sodium ethylenediaminetetraacetate, preferably a mixture of sodium pyrophosphate, dextrose, and ferrous sulfide, without being limited thereto.

For example, in step (i), the electrolyte may include one or more selected from the group consisting of KCl, NaCl, $KHCO_3$, $NaHCO_3$, $K_2CO_3$, $Na_2CO_3$, $KHSO_3$, $NaHSO_4$, $Na_2S_2O_7$, $K_3P_2O_7$, $K_3PO_4$, $Na_3PO_4$, and $Na_2HPO_4$, without being limited thereto.

For example, in step (iii), a molecular weight modifier may be included.

For example, based on 100 parts by weight in total of the graft copolymer, the molecular weight modifier may be included in an amount of 0.01 to 2 parts by weight, preferably 0.05 to 2 parts by weight, more preferably 0.05 to 1 part by weight. Within this range, a polymer having a desired molecular weight may be easily prepared.

For example, the molecular weight modifier may include one or more selected from the group consisting of α-methyl styrene dimer, t-dodecyl mercaptan, n-dodecyl mercaptan, octyl mercaptan, carbon tetrachloride, methylene chloride, methylene bromide, tetra ethyl thiuram disulfide, dipentamethylene thiuram disulfide, and diisopropylxanthogen disulfide, without being limited thereto.

In the present disclosure, 100 parts by weight of the graft copolymer may mean the total weight of the finally obtained graft copolymer; the total weight of the monomers used in the preparation of the polymer seed, the rubber core, and the graft shell, considering that most of the added monomers are used for polymerization; or the total weight of the monomers added in the preparation of the polymer seed and the rubber core and the monomers added in the preparation of the graft shell.

For example, the graft copolymer (A) may be prepared by emulsion polymerization. In this case, chemical resistance, weather resistance, fluidity, tensile strength, and impact strength may be excellent.

The emulsion polymerization may be performed according to an emulsion graft polymerization method commonly practiced in the art to which the present invention pertains, without particular limitation.

Polymerization temperature during the emulsion polymerization is not particularly limited. For example, the emulsion polymerization may be performed at 50 to 85° C., preferably 60 to 80° C.

For example, latex of the graft copolymer (A) may be prepared in the form of powder through a conventional process including coagulation, washing, and drying. As a specific example, a metal salt or an acid is added, coagulation is performed at 60 to 100° C., and aging, dehydration, washing, and drying are performed to prepare the latex of the graft copolymer (A) in powder form, but the present invention is not limited thereto.

For example, based on the total weight of the graft copolymer (A) and the non-graft copolymer (B), the graft copolymer (A) may be included in an amount of 10 to 90% by weight, preferably 30 to 70% by weight, more preferably 40 to 60% by weight. Within this range, heat resistance, transparency, gloss, and impact resistance may be excellent.

(B) Non-Graft Copolymer Including Alkyl (Meth)Acrylate, Aromatic Vinyl Compound, Vinyl Cyanide Compound, and Imide-Based Compound For example, the non-graft copolymer (B) may include 60 to 90% by weight of an alkyl (meth)acrylate, 3 to 33% by weight of an aromatic vinyl compound, 0.1 to 20% by weight of a vinyl cyanide compound, and 0.1 to 20% by weight of an imide-based compound. Within this range, compatibility with the graft copolymer (A) may be excellent, and heat resistance, weather resistance, transparency, gloss, and impact resistance may be excellent.

The non-graft copolymer (B) may include preferably 65 to 85% by weight of an alkyl (meth)acrylate, 8 to 28% by weight of an aromatic vinyl compound, 0.1 to 15% by weight of a vinyl cyanide compound, and 0.5 to 15% by weight of an imide-based compound. Within this range, compatibility with the graft copolymer (A) may be excellent, and heat resistance, weather resistance, transparency, gloss, and impact resistance may be excellent.

The non-graft copolymer (B) may include more preferably 70 to 80% by weight of an alkyl (meth)acrylate, 13 to 23% by weight of an aromatic vinyl compound, 0.1 to 10% by weight of a vinyl cyanide compound, and 1 to 11% by weight of an imide-based compound. Within this range, compatibility with the graft copolymer (A) may be excellent, and heat resistance, weather resistance, transparency, gloss, and impact resistance may be excellent.

In the present disclosure, the term "non-graft copolymer" refers to a copolymer obtained without graft polymerization, and more specifically refers to a copolymer without a graft bond in the presence of rubber.

For example, the imide-based compound of the present invention may include one or more selected from the group consisting of N-phenylmaleimide, maleimide, N-methylmaleimide, N-ethylmaleimide, N-propylmaleimide, N-butylmaleimide, N-isobutylmaleimide, N-cyclohexylmaleimide, and N-benzylmaleimide, preferably N-phenylmaleimide. In this case, heat resistance may be excellent.

The types of the alkyl (meth)acrylate, the aromatic vinyl compound, and the vinyl cyanide compound included in the non-graft copolymer (B) may be the same as the types of the alkyl (meth)acrylate, the aromatic vinyl compound, and the vinyl cyanide compound included in the graft copolymer (A) of the present invention.

For example, the non-graft copolymer (B) may have a weight average molecular weight of 50,000 to 150,000 g/mol, preferably 70,000 to 130,000 g/mol, more preferably 90,000 g/mol to 120,000 g/mol. Within this range, impact resistance and moldability may be excellent.

In the present disclosure, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THE, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+ 1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the non-graft copolymer (B) may have a glass transition temperature of 110° C. or higher, preferably 115° C. or higher, more preferably 115 to 130° C. as measured according to ASTM D3418. In this case, heat resistance may be improved.

In the present disclosure, glass transition temperature may be measured at a heating rate of 10° C./min using a TA Instruments Q100 differential scanning calorimeter (DSC) according to ASTM D3418.

For example, the non-graft copolymer (B) may have a melt flow index of 8 g/10 min or more, preferably 10 g/10 min or more, more preferably 10 to 20 g/10 min as measured at 220° C. under a load of 10 Kg according to ASTM D1238. Within this range, processability may be excellent.

For example, the non-graft copolymer (B) may have a refractive index of 1.5 to 1.525, preferably 1.51 to 1.52 as measured at room temperature using an Abbe refractometer according to ASTM D542. Within this range, since the difference in refractive index between the seed of the graft copolymer (A) and the non-graft copolymer (B) is reduced, transparency and gloss may be excellent.

For example, the non-graft copolymer (B) may be prepared by polymerizing a polymerization solution obtained by mixing 100 parts by weight of a monomer mixture including 60 to 90% by weight of an alkyl (meth)acrylate, 3 to 33% by weight of an aromatic vinyl compound, 0.1 to 20% by weight of a vinyl cyanide compound, and 0.1 to 20% by weight of an imide-based compound, 15 to 40 parts by weight of a reaction solvent, and 0.01 to 1 part by weight of an initiator.

For example, the reaction solvent may include one or more selected from the group consisting of ethylbenzene, toluene, methyl ethyl ketone, and xylene, preferably toluene. In this case, viscosity may be easily controlled, and decrease in polymerization conversion rate may be prevented.

For example, based on 100 parts by weight of the monomer mixture, the reaction solvent may be included in an amount of 25 to 40 parts by weight, preferably 30 to 40 parts by weight. Within this range, excessive increase in viscosity or decrease in polymerization conversion rate and molecular weight may be suppressed.

For example, the initiator used in the preparation of the non-graft copolymer (B) may include one or more selected from the group consisting of t-butylperoxy-2-ethylhexanoate, benzoyl peroxide, t-butylperoxyisobutyrate, 1,1-bis(t-butylperoxy)cyclohexane, 2,2-bis(4,4-di-t-butylperoxycyclohexane) propane, t-hexyl peroxy isopropyl monocarbonate, t-butylperoxylaurate, t-butyl peroxy isopropyl monocarbonate, t-butylperoxy 2-ethylhexylmonocarbonate, t-hexyl peroxybenzoate, t-butyl peroxyacetate, 2,2-bis(t-butylperoxy) butane, t-butyl peroxybenzoate, dicumyl peroxide, 2,5-dimethyl-2,5-bis(t-butylperoxy) hexane, t-butylcumyl peroxide, di-t-butyl peroxide, and di-t-amyl peroxide, preferably t-butylperoxy-2-ethylhexanoate. In this case, polymerization reaction may be easily performed, thereby improving impact resistance and weather resistance.

For example, based on 100 parts by weight of the monomer mixture, the initiator may be included in an amount of 0.01 to 1 part by weight, preferably 0.01 to 0.5 parts by weight, more preferably 0.01 to 0.4 parts by weight. Within this range, polymerization reaction may be easily performed, thereby maintaining mechanical properties and heat resistance at a high level.

For example, in the step of preparing the non-graft copolymer (B), polymerization may be performed at a temperature of 130 to 160° C., preferably 140 to 150° C. while continuously feeding the polymerization solution into a continuous reactor at a rate of 7 to 20 kg/hr, preferably 10 to 15 kg/hr. In this case, compared to batchwise feeding, the particle stability of a copolymer may be increased, and thus a uniform particle internal structure may be realized. As a result, excellent mechanical properties and heat resistance may be achieved.

In the present disclosure, "continuous polymerization" refers to a process in which a polymerized product is continuously discharged, and unreacted monomers are recovered using a volatilization process and reused while continuously feeding materials to be polymerized into a reactor.

For example, the non-graft copolymer (B) may be prepared by solution polymerization, bulk polymerization, emulsion polymerization, or suspension polymerization, preferably bulk polymerization. Solution polymerization, bulk polymerization, emulsion polymerization, and suspension polymerization commonly practiced in the art to which the present invention pertains may be used in the present invention without particular limitation.

For example, based on the total weight of the graft copolymer (A) and the non-graft copolymer (B), the non-graft copolymer (B) may be included in an amount of 10 to 90% by weight, preferably 30 to 70% by weight, more preferably 40 to 60% by weight. Within this range, heat resistance, transparency, gloss, and impact resistance may be excellent.

In the present disclosure, a polymer including a certain compound means a polymer prepared by polymerizing the compound, and a unit in the polymer is derived from the compound.

(C) Alkyl Acrylate-Aromatic Vinyl Compound-Vinyl Cyanide Compound Graft Copolymer Containing Rubber Core Having Average Particle Diameter of 50 to 150 nm For example, the thermoplastic resin composition may include the alkyl acrylate-aromatic vinyl compound-vinyl cyanide compound graft copolymer (C) containing a rubber core having an average particle diameter of 50 to 150 nm. In this case, compatibility with the non-graft copolymer (B) may be excellent, and transparency and gloss may be further improved.

For example, the graft copolymer (C) may have an average particle diameter of 50 to 150 nm, preferably 70 to 130 nm, more preferably 80 to 110 nm. Within this range, physical property balance and impact resistance may be excellent.

For example, the graft copolymer (C) may be a graft copolymer including a rubber core including 78 to 90% by weight of an alkyl acrylate and 10 to 22% by weight of an aromatic vinyl compound and a graft shell surrounding the rubber core and including 65 to 80% by weight of an aromatic vinyl compound, 14 to 25% by weight of a vinyl cyanide compound, and 3 to 15% by weight of an alkyl acrylate. In this case, compatibility with the non-graft copolymer (B) may be excellent, and transparency and gloss may be further improved.

The graft copolymer (C) may include preferably a rubber core including 80 to 90% by weight of an alkyl acrylate and 10 to 20% by weight of an aromatic vinyl compound and a graft shell surrounding the rubber core and including 67 to 77% by weight of an aromatic vinyl compound, 14 to 22% by weight of a vinyl cyanide compound, and 5 to 12% by weight of an alkyl acrylate. In this case, compatibility with the non-graft copolymer (B) may be excellent, and transparency and gloss may be further improved.

The graft copolymer (C) may include more preferably a rubber core including 82 to 88% by weight of an alkyl acrylate and 12 to 18% by weight of an aromatic vinyl compound and a graft shell surrounding the rubber core and including 70 to 75% by weight of an aromatic vinyl compound, 17 to 22% by weight of a vinyl cyanide compound, and 5 to 10% by weight of an alkyl acrylate. In this case, compatibility with the non-graft copolymer (B) may be excellent, and transparency and gloss may be further improved.

For example, the graft copolymer (C) may include 30 to 60% by weight of the rubber core and 40 to 70% by weight of the graft shell, preferably 35 to 65% by weight of the rubber core and 45 to 55% by weight of the graft shell, more preferably 40 to 50% by weight of the rubber core and 50 to 60% by weight of the graft shell. Within this range, mechanical properties may be excellent.

The types of the alkyl acrylate, the aromatic vinyl compound, and the vinyl cyanide compound included in the graft copolymer (C) may be the same as the types of the alkyl acrylate, the aromatic vinyl compound, and the vinyl cyanide compound included in the graft copolymer (A).

For example, a method of preparing the graft copolymer (C) may include step (i) of preparing a rubber core by including 78 to 90% by weight of an alkyl acrylate and 10 to 22% by weight of an aromatic vinyl compound; and step (ii) of preparing a graft copolymer by graft-polymerizing 65 to 80% by weight of an aromatic vinyl compound, 14 to 25% by weight of a vinyl cyanide compound, and 3 to 15% by weight of an alkyl acrylate in the presence of the rubber core. In this case, transparency and gloss may be excellent.

The method of preparing the graft copolymer (C) may include preferably step (i) of preparing a rubber core by including 78 to 90% by weight of an alkyl acrylate, 10 to 22% by weight of an aromatic vinyl compound, a crosslinking agent, an initiator, and an emulsifier; and step (iii) of preparing a graft copolymer by graft-polymerizing 65 to 80% by weight of an aromatic vinyl compound, 14 to 25% by weight of a vinyl cyanide compound, 3 to 15% by weight of an alkyl acrylate, a crosslinking agent, an initiator, and an emulsifier in the presence of the rubber core. In this case, transparency and gloss may be excellent.

The types of the crosslinking agent, the initiator, and the emulsifier used in steps (i) and/or (ii) may be the same as the types of the crosslinking agent, the initiator, and the emulsifier used in the emulsion polymerization step of the graft copolymer (A) of the present invention.

For example, based on 100% by weight in total of the graft copolymer (A), the non-graft copolymer (B), and the graft copolymer (C), the total weight of the graft copolymer (A) and the graft copolymer (C) may be 10 to 90% by weight, preferably 30 to 70% by weight, more preferably 40 to 60% by weight. Within this range, transparency, gloss, and impact resistance may be excellent.

For example, the weight ratio (A:C) of the graft copolymer (A) to the graft copolymer (C) may be 5:5 to 7:3, preferably 5.5:4.5 to 6.5:3.5, more preferably 5.7:4.3 to 6.2:3.8. Within this range, transparency, gloss, and impact resistance may be excellent.

Thermoplastic Resin Composition

When acetone is added to the thermoplastic resin composition, stirring and centrifugation are performed to separate the thermoplastic resin composition into an insoluble gel and a soluble sol, and then refractive indexes thereof are measured, a difference between the refractive index of the sol and the refractive index ($\mu_D^{25}$) of the gel may be preferably 0.005 or less, more preferably 0.004 or less, still more preferably 0.003 or less, still more preferably 0.0001 to 0.003. Within this range, transparency and gloss may be excellent.

In the present disclosure, specifically, when measuring the refractive index difference between the sol and gel of the thermoplastic resin composition, 30 g of acetone is added to 0.5 g of thermoplastic resin composition pellets, stirring is performed at 210 rpm and room temperature for 12 hours using a shaker (SKC-6075, Lab Companion Co.), and centrifugation is performed at 18,000 rpm and 0° C. for 3 hours using a centrifuge (Supra R30, Hanil Science Co.) to separate a gel insoluble in acetone and a sol soluble in acetone. Then, the gel and the sol are dried via forced circulation at 85° C. for 12 hours using a forced convection oven (OF-12GW, Lab Companion Co.), and the refractive indexes of the gel and the sol are measured according to ASTM D542.

In the present disclosure, specifically, the refractive index is measured at room temperature using an Abbe refractometer according to ASTM D542.

The present invention has an effect of providing a resin composition having excellent transparency and gloss by controlling the refractive index difference of the sol and the gel within the above range.

The thermoplastic resin composition has a haze of preferably 5% or less, more preferably 4% or less, still more preferably 3.7% or less, still more preferably 0.1 to 3.7% as measured using an injection specimen having a thickness of 3 mm according to ASTM D1003. Within this range, physical property balance may be excellent.

The thermoplastic resin composition has a haze of preferably 2.5% or less, more preferably 2% or less, still more preferably 1.7% or less, still more preferably 0.1 to 1.7% as measured using an extrusion specimen having a thickness of 0.15 mm according to ASTM D1003. Within this range, physical property balance may be excellent.

In the present disclosure, specifically, the haze of each of an injection specimen having a thickness of 3 mm and an extrusion specimen having a thickness of 0.15 mm may be measured using a haze meter (model name: HM-150, MURAKAMI Co.) according to ASTM D1003. As a haze value decreases, transparency increases.

The thermoplastic resin composition has a gloss of preferably 115 or more, more preferably 125 or more, still more preferably 125 to 145, still more preferably 130 to 140 as measured at 45° using an injection specimen having a thickness of 3 mm according to ASTM D2457. Within this range, physical property balance may be excellent.

The thermoplastic resin composition has a gloss of preferably 110 or more, more preferably 115 or more, still more preferably 115 to 135, still more preferably 118 to 130 as measured at 60° using an extrusion specimen having a thickness of 0.15 mm according to ASTM D2457. Within this range, physical property balance may be excellent.

The thermoplastic resin composition may have an Izod impact strength of preferably 11 kgf·cm/cm or more, more preferably 12.5 kgf·cm/cm or more, still more preferably 12.5 to 15 kgf·cm/cm as measured at room temperature using a specimen having a thickness of ¼" according to ASTM D256. Within this range, physical property balance may be excellent.

The thermoplastic resin composition may have a heat deflection temperature of preferably 92° C. or higher, more preferably 92 to 100° C., still more preferably 93 to 97° C. as measured under a load of 18.5 kgf according to ASTM D648. Within this range, physical property balance and heat resistance may be excellent.

The thermoplastic resin composition may have a Vicat softening temperature of preferably 100° C. or higher, more preferably 100 to 110° C., still more preferably 100 to 105° C. as measured at a heating rate of 50° C./h under a load of 50 N according to ASTM D1525. Within this range, physical property balance and heat resistance may be excellent.

After leaving an specimen for 3,000 hours in an accelerated weather resistance tester (Weather-O-Meter, Ci4000, ATLAS Co., xenon arc lamp, Quartz (inner)/S. Boro (outer) filters, irradiance of 0.55 W/$m^2$ at 340 nm) according to SAE J1960, when the degree of discoloration is measured using a color difference meter, and weather resistance (ΔE) is calculated by Equation 7 below, the thermoplastic resin composition may have a weather resistance (ΔE) of preferably 2.7 or less, more preferably 2.5 or less, still more preferably 2.4 or less, still more preferably 0.1 to 2.4. Within this range, physical property balance may be excellent.

$$\Delta E = \sqrt{(L' - L_0)^2 + (a' - a_0)^2 + (b' - b_0)^2} \quad \text{[Equation 7]}$$

ΔE is an arithmetic mean value of L, a, and b values of the specimen measured by the CIE LAB color coordinate system before and after the accelerated weather resistance test. Weather resistance increases as the value of ΔE approaches zero.

For example, the thermoplastic resin composition may include one or more selected from the group consisting of a lubricant, an antioxidant, and a UV absorber.

For example, the lubricant may include one or more selected from the group consisting of ethylene bis stearamide, oxidized polyethylene wax, magnesium stearate, calcium stearamide, and stearic acid. In this case, heat resistance and fluidity may be improved.

For example, based on 100 parts by weight in total of the graft copolymer (A) and the non-graft copolymer (B), the lubricant may be included in an amount of 0.01 to 3 parts by weight, preferably 0.05 to 2 parts by weight.

For example, the antioxidant may include a phenol-based antioxidant, a phosphorus-based antioxidant, or a mixture thereof, preferably a phenol-based antioxidant. In this case, heat-induced oxidation may be prevented during an extrusion process, and mechanical properties and heat resistance may be excellent.

For example, based on 100 parts by weight in total of the graft copolymer (A) and the non-graft copolymer (B), the antioxidant may be included in an amount of 0.01 to 3 parts by weight, preferably 0.05 to 2 parts by weight. Within this range, physical property balance may be excellent, and heat resistance may be improved.

For example, the UV absorber may include one or more selected from the group consisting of a triazine-based UV absorber, a benzophenone-based UV absorber, a benzotriazole-based UV absorber, a benzoate-based UV absorber, and a cyanoacrylate-based UV absorber, without being limited thereto.

For example, based on 100 parts by weight in total of the graft copolymer (A) and the non-graft copolymer (B), the UV absorber may be included in an amount of 0.01 to 3 parts by weight, preferably 0.05 to 2 parts by weight. Within this range, physical property balance may be excellent, and light resistance may be improved.

For example, the thermoplastic resin composition may further include one or more additives selected from the group consisting of a fluorescent brightening agent, an antistatic agent, a chain extender, a release agent, a pigment, a dye, an antibacterial agent, a processing aid, a metal deactivator, a smoke suppressant, an inorganic filler, glass fiber, an anti-friction agent, and an anti-wear agent.

For example, based on 100 parts by weight in total of the graft copolymer (A) and the non-graft copolymer (B), each of the additives may be included in an amount of 0.01 to 5 parts by weight, preferably 0.1 to 3 parts by weight, more preferably 0.1 to 1 part by weight. In this case, physical properties may be improved, and economics may be excellent due to reduction in preparation cost.

Hereinafter, a method of preparing the thermoplastic resin composition of the present invention and a molded article including the same will be described. In describing the method and the molded article, all of the above-described thermoplastic resin composition is included.

Method of Preparing Thermoplastic Resin Composition

A method of a thermoplastic preparing resin composition according to the present invention includes a step of kneading and extruding, at 180 to 300° C. and 80 to 400 rpm, an alkyl (meth)acrylate-aromatic vinyl compound-vinyl cyanide compound graft copolymer (A) including a polymer seed including 70 to 85% by weight of an alkyl (meth) acrylate and 15 to 30% by weight of an aromatic vinyl compound, a rubber core surrounding the polymer seed and including 78 to 90% by weight of an alkyl acrylate and 10 to 22% by weight of an aromatic vinyl compound, and a graft shell surrounding the rubber core and including 65 to 80% by weight of an aromatic vinyl compound, 14 to 25% by weight of a vinyl cyanide compound, and 3 to 15% by weight of an alkyl acrylate; and a non-graft copolymer (B) including an alkyl (meth)acrylate, an aromatic vinyl compound, a vinyl cyanide compound, and an imide-based compound, wherein the graft copolymer (A) satisfies both Equations 1 and 2 below. In this case, heat resistance, transparency, gloss, and impact resistance may be excellent.

$$200 \leq 2*r2 \leq 300 \quad \text{[Equation 1]}$$

$$25 \leq r2 - r1 \leq 45 \quad \text{[Equation 2]}$$

In Equations 1 and 2, r1 represents an average radius (nm) from the center of the graft copolymer to the seed, and r2 represents an average radius (nm) from the center of the graft copolymer to the core.

For example, in the step of kneading and extruding, an alkyl acrylate-aromatic vinyl compound-vinyl cyanide compound graft copolymer (C) containing a rubber core having an average particle diameter of 50 to 150 nm may be included. Preferably, an alkyl acrylate-aromatic vinyl compound-vinyl cyanide compound graft copolymer (C) containing a rubber core having an average particle diameter of 50 to 150 nm and including 78 to 90% by weight of an alkyl acrylate and 10 to 22% by weight of an aromatic vinyl compound and a graft shell surrounding the rubber core and including 65 to 80% by weight of an aromatic vinyl compound, 14 to 25% by weight of a vinyl cyanide compound, and 3 to 15% by weight of an alkyl acrylate may be included. In this case, transparency, gloss, and weather resistance may be greatly improved.

For example, the kneading and extrusion may be performed using a single-screw extruder, a twin-screw extruder, or a Banbury mixer. In this case, the composition may be uniformly dispersed, improving compatibility.

For example, the kneading and extrusion may be performed at a barrel temperature of 180 to 300° C., preferably 190 to 280° C., more preferably 200 to 260° C. In this case, throughput per unit time may be appropriate, melt-kneading may be sufficiently performed, and problems such as thermal decomposition of resin components do not occur.

For example, the kneading and extrusion may be performed at a screw rotation speed of 80 to 400 rpm, preferably 100 to 300 rpm, more preferably 150 to 250 rpm. In this case, throughput per unit time may be appropriate, and process efficiency may be excellent.

For example, the thermoplastic resin composition obtained through the extrusion may be prepared into pellets using a pelletizer.

In addition, the resin composition may be manufactured into a molded article used in various industrial fields through a molding process such as a blow process and an injection process.

Molded Article

For example, a molded article of the present invention may include the thermoplastic resin composition of the present invention. Since the molded article has excellent heat resistance, weather resistance, transparency, gloss, and impact resistance, the high-quality molded article may be applied to fields requiring transparency.

For example, the molded article may be an injection-molded article, a film, or a sheet. In this case, since the molded article includes the thermoplastic resin composition of the present invention, the high-quality molded article that may sufficiently satisfy the market demand for heat resistance, weather resistance, impact resistance, transparency, and gloss may be provided.

For example, the molded article may be an automotive interior material, an automotive exterior material, a building material, a home appliance, or a medical part. In this case, since transparency, gloss, heat resistance, weather resistance, and impact resistance are excellent, all market requirements may be satisfied.

A method of manufacturing the molded article 41 preferably includes a step of manufacturing pellets by kneading and extruding, at 180 to 300° C. and 80 to 400 rpm, an alkyl (meth)acrylate-aromatic vinyl compound-vinyl cyanide compound graft copolymer (A) including a polymer seed including 70 to 85% by weight of an alkyl (meth)acrylate and 15 to 30% by weight of an aromatic vinyl compound, a rubber core surrounding the polymer seed and including 78 to 90% by weight of an alkyl acrylate and 10 to 22% by weight of an aromatic vinyl compound, and a graft shell surrounding the rubber core and including 65 to 80% by weight of an aromatic vinyl compound, 14 to 25% by weight of a vinyl cyanide compound, and 3 to 15% by weight of an alkyl acrylate; and a non-graft copolymer (B) including an alkyl (meth)acrylate, an aromatic vinyl compound, a vinyl cyanide compound, and an imide-based compound; and a step of injecting or extruding the manufactured pellets using an injection machine or an extruder, wherein the graft copolymer (A) satisfies both Equations 1 and 2 below. In this case, a molded article having excellent transparency, gloss, heat resistance, weather resistance, and impact resistance may be manufactured, and the high-quality molded article may be applied to fields requiring transparency.

$$200 \leq 2*r2 \leq 300 \quad \text{[Equation 1]}$$

$$25 \leq r2 - r1 \leq 45 \quad \text{[Equation 2]}$$

In Equations 1 and 2, r1 represents an average radius (nm) from the center of the graft copolymer to the seed, and r2 represents an average radius (nm) from the center of the graft copolymer to the core.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples are as follows.

- Graft copolymer (A): Prepared in Examples 1 to 10 and Comparative Examples 1 to 11 below.
- Phenyl maleimide-transparency-styrene-acrylonitrile (PMI-T-SAN) copolymer (B-1): Non-graft copolymer (weight average molecular weight: 100,000 g/mol, Tg: 120° C.) including 75% by weight of methyl methacrylate, 18% by weight of styrene, 1% by weight of acrylonitrile, and 6% by weight of N-phenylmaleimide SAMMA copolymer (B-2): Non-graft copolymer including 71% by weight of methyl methacrylate, 22% by weight of styrene, and 7% by weight of acrylonitrile Graft copolymer (C): Graft copolymer (rubber core: 45% by weight and graft shell: 55% by weight) including a rubber core including 85% by weight of butyl acrylate and 15% by weight of styrene and having an average particle diameter of 90 mm and a graft shell surrounding the rubber core and including 72% by weight of styrene, 20% by weight of acrylonitrile, and 8% by weight of butyl acrylate Lubricant: SUNLUBE EBS (SUNKOO Co.)

Antioxidant: Songnox 1076 (Songwon Co.) and Irgafos 168 (BASF Co.)

UV absorber: Tinuvin 770 (BASF Co.), Tinuvin P (BASF Co.)

Example 1

An acrylate-styrene-acrylonitrile graft copolymer (A) including a polymer seed including methyl methacrylate (hereinafter referred to as "MMA") and styrene (hereinafter referred to as "SM") in a weight ratio of 72/28, a rubber core including butyl acrylate (hereinafter referred to as "BA") and SM in a weight ratio of 85/15, and a graft shell including SM, acrylonitrile (hereinafter referred to as "AN"), and BA in a weight ratio of 76/16/8 was prepared. In this case, in the graft copolymer (A), 20% by weight of the polymer seed, 40% by weight of the rubber core, and 40% by weight of the graft shell were included.

1 part by weight of a lubricant, 1 part by weight of an antioxidant, and 0.6 parts by weight of an UV absorber were added to 50 parts by weight of the prepared graft copolymer (A) and 50 parts by weight of the non-graft copolymer (B), and kneading and extrusion were performed at 220° C. and 200 rpm to prepare pellets. The prepared pellets were injected at a molding temperature of 220° C. to prepare an injection specimen for measuring physical properties. In addition, the prepared pellets were extruded at 220° C. and 200 rpm using a single-screw film extruder to prepare an extrusion specimen for measuring physical properties.

Examples 2 to 8

The same procedure as in Example 1 was performed except that, instead of the graft copolymer (A) of Example 1, the graft copolymer (A) polymerized according to the components and contents shown in Tables 1 and 2 was used.

Example 9

The same procedure as in Example 7 was performed except that, instead of 50 parts by weight of the graft copolymer (A) prepared in Example 7, 30 parts by weight of the graft copolymer (A) and 20 parts by weight of the graft copolymer (C) were used.

Example 10

The same procedure as in Example 7 was performed except that, instead of 50 parts by weight of the graft copolymer (A) prepared in Example 7, 35 parts by weight of the graft copolymer (A) and 15 parts by weight of the graft copolymer (C) were used.

Comparative Examples 1 to 10

The same procedure as in Example 1 was performed except that, instead of the ASA graft copolymer (A) of Example 1, the ASA graft copolymer (A) polymerized according to the components and contents shown in Tables 3 and 4 below was used.

Comparative Example 11

The same procedure as in Example 5 was performed except that, instead of the PMI-T-SAN copolymer (B-1) of Example 5, the SAMMA copolymer (B-2) was used.

Comparative Example 12

A transparent acrylonitrile-butadiene-styrene resin (TR557, LG Chemical Co.) was injected to prepare an injection specimen for measuring physical properties.

Test Examples

The properties of the pellets and specimens prepared in Examples 1 to 10 and Comparative Examples 1 to 12 were measured by the following methods, and the results are shown in Tables 1 to 4 below.

The refractive indexes of the seed, rubber core, and graft shell of the graft copolymer and the refractive index of the non-graft copolymer were calculated by Equation 3 below.

$$RI = \sum Wti * RIi \quad \text{[Equation 3]}$$

Wti=Weight fraction (%) of each component of copolymer

RIi=Refractive index of polymer of each component of copolymer

Average particle diameters (nm) of polymer seed, rubber core, and graft shell: For each of the polymer seed, the rubber core, and the graft shell, upon completion of preparation thereof, a sample was obtained, and the average particle diameter of the sample was measured by dynamic light scattering. Specifically, the average particle diameter was measured as an intensity value using a Nicomp 380 particle size analyzer (manufacturer: PSS) in a Gaussian mode. As a specific measurement example, a sample was prepared by diluting 0.1 g of latex (total solids content: 35 to 50 wt %) 1,000 to 5,000-fold with distilled water. Then, the average particle diameter of the sample was measured using a flow cell in auto-dilution in a measurement mode of dynamic light scattering/intensity 300 kHz/intensity-weight Gaussian analysis. At this time, setting values were as follows: temperature: 23° C. and measurement wavelength: 632.8 nm.

Note that, r1 was a value obtained by dividing the average particle diameter of the seed by 2, and r2 was a value obtained by dividing the average particle diameter of the seed-containing core by 2.

Izod impact strength (IMP; kgf·cm/cm): Izod impact strength was measured at room temperature using an injection specimen having a thickness of ¼" according to ASTM D256.

Haze (%): The haze of an injection specimen having a thickness of 3 mm and the haze of an extrusion specimen having a thickness of 0.15 mm were measured according to ASTM D1003. As haze decreases, transparency increases.

Gloss of injection specimen: The gloss of an injection specimen having a thickness of 3 mm was measured at 45° according to ASTM D2457.

Gloss of extrusion specimen: The gloss of an extrusion specimen having a thickness of 0.15 mm was measured at 60° according to ASTM D2457.

Difference in refractive index between sol and gel in thermoplastic resin composition: 30 g of acetone was added to 0.5 g of thermoplastic resin composition pellets, stirring was performed at 210 rpm and room temperature for 12 hours using a shaker (SKC-6075, Lab Companion Co.), and centrifugation was performed at 18,000 rpm and 0° C. for 3 hours using a centrifuge (Supra R30, Hanil Science Co.) to separate a gel insoluble in acetone and a sol soluble in acetone. Then, the gel and the sol were dried via forced circulation at 85° C. for 12 hours using a forced convection oven (OF-12GW, Lab Companion Co.), and the refractive indexes of the gel and the sol were measured at room temperature using an Abbe refractometer according to ASTM D542. Then, difference in refractive indexes was calculated.

Heat deflection temperature (HDT, ° C.): Heat deflection temperature was measured under a load of 18.5 kgf according to ASTM D648.

Vicat softening temperature (Vicat, ° C.): Vicat softening temperature was measured at a heating rate of 50° C./h under a load of 50 N according to ASTM D1525.

Weather resistance (ΔE): After leaving an specimen for 3,000 hours in an accelerated weather resistance tester (Weather-O-Meter, Ci4000, ATLAS Co., xenon arc lamp, Quartz (inner)/S.Boro (outer) filters, irradiance of 0.55 W/m$^2$ at 340 nm) according to SAE J1960, the degree of discoloration was measured using a color difference meter, and weather resistance (ΔE) was calculated by Equation 7 below. ΔE below is an arithmetic mean value of L, a, and b values of the specimen measured by the CIE LAB color coordinate system before and after the accelerated weather resistance test. Weather resistance increases as the value of ΔE approaches zero.

$$\Delta E = \sqrt{(L' - L_0)^2 + (a' - a_0)^2 + (b' - b_0)^2} \quad \text{[Equation 7]}$$

In Equation 7, L', a', and b' are respectively L, a, and b values measured using the CIE LAB color coordinate system after leaving a specimen for 3,000 hours according to SAE J1960, and $L_0$, $a_0$, and $b_0$ are respectively L, a, and b values measured using the CIE LAB color coordinate system before leaving the specimen.

TABLE 1

| Classification | | | Example 1 | Example 2 | Example 3 | Example 4 |
|---|---|---|---|---|---|---|
| Graft copolymer (A) | Seed | MMA/SM (% by weight) | 72/28 | 72/28 | 72/28 | 72/28 |
| | Core | BA/SM (% by weight) | 85/15 | 85/15 | 85/15 | 85/15 |
| | Shell | SM/AN/BA (% by weight) | 76/16/8 | 71/18/11 | 71/24/5 | 68/22/10 |
| | | 2*r2 (nm) | 240 | 240 | 240 | 240 |
| | | r2 − r1 (nm) | 35 | 35 | 35 | 35 |
| | | Difference between refractive index of core and refractive index of shell | 0.089 | 0.083 | 0.087 | 0.082 |
| Thermoplastic resin composition | | Graft copolymer (A) (% by weight) | 50 | 50 | 50 | 50 |
| | | PMI-T-SAN copolymer (B-1) (% by weight) | 50 | 50 | 50 | 50 |
| | | Graft copolymer (C) (% by weight) | — | — | — | — |
| | Difference between refractive index of seed of graft copolymer (A) and refractive index of non-graft copolymer (B) | | 0.004 | 0.004 | 0.004 | 0.004 |
| | Injection specimen | Haze (%) | 4.7 | 4.3 | 4.4 | 4.6 |
| | | Impact strength (kgf · cm/cm) | 12 | 13 | 11 | 13 |
| | | Gloss | 126 | 122 | 128 | 123 |
| | | HDT (° C.) | 93.3 | 92.1 | 94 | 92.5 |
| | | Vicat (° C.) | 101.3 | 100.5 | 102.4 | 100.8 |
| | | Weather resistance (ΔE) | 2.6 | 2.3 | 2.5 | 2.4 |

TABLE 1-continued

| Classification | | Example 1 | Example 2 | Example 3 | Example 4 |
|---|---|---|---|---|---|
| Extrusion specimen | Haze (%) | 2.3 | 2.2 | 2.4 | 2.2 |
| | Gloss | 120 | 115 | 121 | 117 |
| Refractive index difference between sol and gel in thermoplastic resin composition | | 0.0038 | 0.0023 | 0.0033 | 0.0028 |

TABLE 2

| Classification | | | Example 5 | Example 6 | Example 7 | Example 8 | Example 9 | Example 10 |
|---|---|---|---|---|---|---|---|---|
| Graft copolymer (A) | Seed | MMA/SM (% by weight) | 72/28 | 76/24 | 78/22 | 82/18 | 78/22 | 78/22 |
| | Core | BA/SM (% by weight) | 85/15 | 87/13 | 85/15 | 85/15 | 85/15 | 85/15 |
| | Shell | SM/AN/BA (% by weight) | 72/20/8 | 72/20/8 | 72/20/8 | 72/20/8 | 72/20/8 | 72/20/8 |
| | | 2*r2 (nm) | 240 | 240 | 240 | 240 | 240 | 240 |
| | | r2 − r1 (nm) | 35 | 35 | 35 | 35 | 35 | 35 |
| | | Difference between refractive index of core and refractive index of shell | 0.086 | 0.088 | 0.086 | 0.086 | 0.086 | 0.086 |
| Thermoplastic resin composition | | Graft copolymer (A) (% by weight) | 50 | 50 | 50 | 50 | 30 | 35 |
| | | PMI-T-SAN copolymer (B-1) (% by weight) | 50 | 50 | 50 | 50 | 50 | 50 |
| | | Graft copolymer (C) (% by weight) | — | — | — | — | 20 | 15 |
| Difference between refractive index of seed of graft copolymer (A) and refractive index of non-graft copolymer (B) | | | 0.004 | 0.000 | 0.002 | 0.006 | 0.002 | 0.002 |
| Injection specimen | | Haze (%) | 4 | 3.8 | 3.6 | 3.8 | 2.5 | 2.7 |
| | | Impact strength (kgf · cm/cm) | 12 | 14 | 13 | 13 | 13 | 12 |
| | | Gloss | 125 | 129 | 130 | 132 | 131 | 133 |
| | | HDT (° C.) | 93.1 | 92.9 | 93.2 | 93 | 93 | 93.1 |
| | | Vicat (° C.) | 101.2 | 100.9 | 101.1 | 101.5 | 100.9 | 101.1 |
| | | Weather resistance (ΔE) | 2.3 | 2.6 | 2.4 | 2.4 | 2.1 | 2.2 |
| Extrusion specimen | | Haze (%) | 2.1 | 2 | 1.7 | 1.6 | 1.4 | 1.5 |
| | | Gloss | 118 | 119 | 119 | 122 | 120 | 121 |
| Refractive index difference between sol and gel in thermoplastic resin composition | | | 0.0019 | 0.0027 | 0.0029 | 0.0031 | 0.0026 | 0.0028 |

TABLE 3

| Classification | | | Comparative Example 1 | Comparative Example 2 | Comparative Example 3 | Comparative Example 4 | Comparative Example 5 | Comparative Example 6 |
|---|---|---|---|---|---|---|---|---|
| Graft copolymer (A) | Seed | MMA/SM (% by weight) | 92/8 | 68/32 | 72/28 | 72/28 | 72/28 | 72/28 |

TABLE 3-continued

| Classification | | | Comparative Example 1 | Comparative Example 2 | Comparative Example 3 | Comparative Example 4 | Comparative Example 5 | Comparative Example 6 |
|---|---|---|---|---|---|---|---|---|
| | Core | BA/SM (% by weight) | 85/15 | 85/15 | 95/5 | 70/30 | 85/15 | 85/15 |
| | Shell | SM/AN/BA (% by weight) | 72/20/8 | 72/20/8 | 72/20/8 | 72/20/8 | 72/8/20 | 75/25/0 |
| | | 2*r2 (nm) | 240 | 240 | 240 | 240 | 240 | 240 |
| | | r2 − r1 (nm) | 35 | 35 | 35 | 35 | 35 | 35 |
| | | Difference between refractive index of core and refractive index of shell | 0.086 | 0.086 | 0.099 | 0.066 | 0.079 | 0.093 |
| Thermoplastic resin composition | | Graft copolymer (A) (% by weight) | 50 | 50 | 50 | 50 | 50 | 50 |
| | | PMI-T-SAN copolymer (B-1) (% by weight) | 50 | 50 | 50 | 50 | 50 | 50 |
| | | Graft copolymer (C) (% by weight) | | | | | | |
| Difference between refractive index of seed of graft copolymer (A) and refractive index of non-graft copolymer (B) | | | 0.016 | 0.008 | 0.004 | 0.004 | 0.004 | 0.004 |
| Injection specimen | | Haze (%) | 40.5 | 17.2 | 55.3 | 30.7 | 46.2 | 20.9 |
| | | Impact strength (kgf · cm/cm) | 6 | 8 | 15 | 4 | 5 | 11 |
| | | Gloss | 90 | 93 | 85 | 87 | 79 | 94 |
| | | HDT (° C.) | 93.5 | 93.1 | 92.5 | 93.6 | 90.9 | 95.1 |
| | | Vicat (° C.) | 102 | 101.1 | 100.7 | 102.1 | 100.1 | 103.4 |
| | | Weather resistance (ΔE) | 2.5 | 2.3 | 2.4 | 2.1 | 2.7 | 2.6 |
| Extrusion specimen | | Haze (%) | 5.3 | 4.1 | 6.6 | 4.3 | 5.5 | 4.5 |
| | | Gloss | 89 | 90 | 85 | 83 | 70 | 88 |
| Refractive index difference between sol and gel in thermoplastic resin composition | | | 0.0070 | 0.0087 | 0.0131 | 0.0082 | 0.0129 | 0.0136 |

TABLE 4

| Classification | | | Comparative Example 7 | Comparative Example 8 | Comparative Example 9 | Comparative Example 10 | Comparative Example 11 | Comparative Example 12 |
|---|---|---|---|---|---|---|---|---|
| Graft copolymer (A) | Seed | MMA/SM (% by weight) | 72/28 | 72/28 | 0/100 | 100/0 | 72/28 | — |
| | Coe | BA/SM (% by weight) | 85/15 | 85/15 | 100/0 | 81/19 | 85/15 | — |
| | Shell | SM/AN/BA (% by weight) | 72/20/8 | 72/20/8 | 75/25/0 | 100 (MMA) | 72/20/8 | — |
| | | 2*r2 (nm) | 360 | 160 | 230 | 240 | 240 | — |
| | | r2 − r1 (nm) | 52 | 23 | 40 | 35 | 35 | — |

TABLE 4-continued

| Classification | | | Comparative Example 7 | Comparative Example 8 | Comparative Example 9 | Comparative Example 10 | Comparative Example 11 | Comparative Example 12 |
|---|---|---|---|---|---|---|---|---|
| | | Difference between refractive index of core and refractive index of shell | 0.086 | 0.086 | 0.112 | 0.005 | 0.086 | — |
| Thermoplastic resin composition | | Graft copolymer (A) (% by weight) | 50 | 50 | 50 | 50 | 50 | — |
| | | PMI-T-SAN copolymer (B-1) (% by weight) | 50 | 50 | 50 | 50 | — | — |
| | | SAMMA copolymer (B-2) (% by weight) | — | — | — | — | 50 | — |
| | | Graft copolymer (C) (% by weight) | — | — | — | — | — | — |
| | Difference between refractive index of seed of graft copolymer (A) and refractive index of non-graft copolymer (B) | | 0.004 | 0.004 | 0.076 | 0.024 | 0.004 | — |
| | Injection specimen | Haze (%) | 23.5 | 2.1 | 71.4 | 45.1 | 4.2 | 2 |
| | | Impact strength (kgf · cm/cm) | 15 | 3 | 16 | 5 | 13 | 17 |
| | | Gloss | 92 | 133 | 82 | 90 | 129 | 150 |
| | | HDT (° C.) | 92.7 | 93.4 | 94.8 | 95.3 | 80.5 | 81 |
| | | Vicat (° C.) | 101.2 | 101.8 | 103 | 103.5 | 92.3 | 89 |
| | | Weather resistance (ΔE) | 2.9 | 2.3 | 2.8 | 2.3 | 2.5 | 8.8 |
| | Extrusion specimen | Haze (%) | 5.1 | 1.3 | 5.4 | 4.1 | 2.1 | — |
| | | Gloss | 87 | 119 | 85 | 86 | 125 | — |
| | Refractive index difference between sol and gel in thermoplastic resin composition | | 0.0037 | 0.0013 | 0.0100 | 0.0245 | 0.0018 | — |

As shown in Tables 1 to 4, it can be confirmed that the thermoplastic resin compositions (Examples 1 to 10) according to the present invention have heat deflection temperature and Vicat softening temperature, equal to or superior to those of the thermoplastic resin compositions of Comparative Examples 1 to 12. In addition, the thermoplastic resin compositions according to the present invention have excellent impact strength, haze, gloss, and weather resistance. Note that, in terms of haze and gloss, Examples 9 and 10 including the graft copolymer (A) and the graft copolymer (C) are superior.

On the other hand, in the case of Comparative Examples 1 and 2 in which the composition ratio of the polymer seed of the graft copolymer (A) is out of the range of the present invention, since difference in refractive index between a sol and a gel in a thermoplastic resin composition is large, the haze and gloss of both injection and extrusion specimens, and impact strength are poor.

In addition, in the case of Comparative Examples 3 and 4 in which the composition of the rubber core of the graft copolymer (A) is out of the range of the present invention, the difference in refractive index between the rubber core and shell of the graft copolymer (A) is out of the range of 0.8 to 0.9. In addition, since the refractive index difference between a sol and a gel in a thermoplastic resin composition increases, the haze and gloss of both injection and extrusion specimens are poor. In particular, in the case of Comparative Example 4, impact strength is very low.

In addition, in the case of Comparative Examples 5 and 6 in which the composition of the graft shell of the graft copolymer (A) is out of the range of the present invention, the difference in refractive index between the rubber core and shell of the graft copolymer (A) is out of the range of 0.8 to 0.9. In addition, since the refractive index difference between a sol and a gel in a thermoplastic resin composition increases, the haze and gloss of both injection and extrusion specimens are poor. In the case of Comparative Example 5, impact strength is also low.

In addition, in the case of Comparative Example 7 in which 2*r2 and r2-r1 of the rubber core of the graft copolymer (A) exceed the range of the present invention, haze, gloss, and weather resistance are poor. In the case of Comparative Example 8 in which 2*r2 and r2-r1 of the rubber core of the graft copolymer (A) are less than the range of the present invention, impact strength is very poor.

In addition, in the case of Comparative Example 9 including only styrene in the seed and only butyl acrylate in the rubber core as in the prior art, the difference between the refractive index of the rubber core of the graft copolymer (A) and the refractive index of the shell is out of the range of 0.8 to 0.9. The difference in refractive index between the polymer seed of the graft copolymer (A) and the non-graft copolymer (B) and the refractive index difference between a sol and a gel in a thermoplastic resin composition increase, resulting in deterioration of haze, gloss, and weather resistance.

In addition, in the case of Comparative Example 10 in which only methyl methacrylate is included in a seed and a shell, respectively, the difference between the refractive index of the rubber core of the graft copolymer (A) and the refractive index of the shell is out of the range of 0.8 to 0.9, and the difference in refractive index between the polymer seed of the graft copolymer (A) and the non-graft copolymer (B) increases, resulting in decrease in haze, gloss, and impact strength.

In addition, in the case of Comparative Example 11 in which the SAMMA copolymer (B-2) is used instead of the PMI-T-SAN copolymer (B-1), heat deflection temperature and Vicat softening temperature are reduced, resulting in decrease in heat resistance.

In addition, in the case of Comparative Example 12 in which the transparent acrylonitrile-butadiene-styrene resin is used, weather resistance is very poor.

In conclusion, when the composition and composition ratio of the polymer seed, core, and shell of the alkyl (meth)acrylate-aromatic vinyl compound-vinyl cyanide compound graft copolymer (A) are adjusted within a predetermined range according to the present invention, and the difference between the refractive index of the core and the refractive index of the shell and the difference between the refractive index of the polymer seed of the graft copolymer (A) and the refractive index of the non-graft copolymer (B) are reduced, impact resistance, transparency, gloss, heat resistance, and weather resistance may be excellent.

The invention claimed is:

1. A thermoplastic resin composition, comprising:
- an alkyl (meth)acrylate-aromatic vinyl compound-vinyl cyanide compound graft copolymer (A) comprising:
  - a polymer seed comprising:
    - 70 to 85% by weight of a first alkyl (meth)acrylate and
    - 15 to 30% by weight of a first aromatic vinyl compound,
  - a rubber core surrounding the polymer seed and comprising:
    - 78 to 90% by weight of a first alkyl acrylate and
    - 10 to 22% by weight of a second aromatic vinyl compound, and
  - a graft shell surrounding the rubber core and comprising:
    - 65 to 80% by weight of a third aromatic vinyl compound,
    - 14 to 25% by weight of a first vinyl cyanide compound, and
    - 3 to 15% by weight of a second alkyl acrylate; and
- a non-graft copolymer (B) comprising:
  - a second alkyl (meth)acrylate,
  - a fourth aromatic vinyl compound,
  - a second vinyl cyanide compound, and
  - an imide-based compound,
- wherein the graft copolymer (A) satisfies both Equations 1 and 2 below:

$$200 \leq 2 \times r2 \leq 300 \quad \text{Equation 1}$$

$$25 \leq r2 - r1 \leq 45, \quad \text{Equation 2}$$

wherein:
- r1 represents an average radius (nm) from a center of the graft copolymer to a surface of the polymer seed facing the rubber core, and
- r2 represents an average radius (nm) from the center of the graft copolymer to a surface of the rubber core facing the graft shell.

2. The thermoplastic resin composition according to claim 1, wherein, in the graft copolymer (A), a difference between a refractive index of the rubber core and a refractive index of the graft shell is 0.08 to 0.09.

3. The thermoplastic resin composition according to claim 2, wherein a difference between a refractive index of the polymer seed of the graft copolymer (A) and a refractive index of the non-graft copolymer (B) is 0.007 or less,
- wherein the non-graft copolymer (B) comprises:
  - 60 to 90% by weight of the second alkyl (meth) acrylate,
  - 3 to 33% by weight of the fourth aromatic vinyl compound,
  - 0.1 to 20% by weight of the second vinyl cyanide compound, and
  - 0.1 to 20% by weight of the imide-based compound, and
- wherein a difference between a refractive index of a sol of the thermoplastic resin composition and a refractive index of a gel of the thermoplastic resin composition is 0.005 or less, and the refractive indexes are obtained by adding acetone to the thermoplastic resin composition, performing stirring and centrifugation to obtain an insoluble gel and a soluble sol, and then measuring the refractive indexes of the sol and the gel.

4. The thermoplastic resin composition according to claim 1, wherein a difference between a refractive index of the polymer seed of the graft copolymer (A) and a refractive index of the non-graft copolymer (B) is 0.007 or less.

5. The thermoplastic resin composition according to claim 1, wherein, based on 100% by weight in total of the graft copolymer (A), the graft copolymer (A) comprises:
- 5 to 35% by weight of the polymer seed,
- 25 to 55% by weight of the rubber core, and
- 25 to 55% by weight of the graft shell.

6. The thermoplastic resin composition according to claim 1, wherein the non-graft copolymer (B) comprises:
- 60 to 90% by weight of the second alkyl (meth)acrylate,
- 3 to 33% by weight of the fourth aromatic vinyl compound,
- 0.1 to 20% by weight of the second vinyl cyanide compound, and
- 0.1 to 20% by weight of the imide-based compound.

7. The thermoplastic resin composition according to claim 1, wherein, in the non-graft copolymer (B), the imide-based compound comprises one or more selected from the group consisting of N-phenylmaleimide, maleimide, N-methylmaleimide, N-ethylmaleimide, N-propylmaleimide, N-butylmaleimide, N-isobutylmaleimide, N-cyclohexylmaleimide, and N-benzylmaleimide.

8. The thermoplastic resin composition according to claim 1, wherein the thermoplastic resin composition comprises:

10 to 90% by weight of the graft copolymer (A), and 10 to 90% by weight of the non-graft copolymer (B), based on a total weight of the graft copolymer (A) and the non-graft copolymer (B).

9. The thermoplastic resin composition according to claim 1, further comprising an alkyl acrylate-aromatic vinyl compound-vinyl cyanide compound graft copolymer (C) containing a rubber core having an average particle diameter of 50 to 150 nm.

10. The thermoplastic resin composition according to claim 1, wherein a difference between a refractive index of a sol of the thermoplastic resin composition and a refractive index of a gel of the thermoplastic resin composition is 0.005 or less, and the refractive indexes are obtained by adding acetone to the thermoplastic resin composition, performing stirring and centrifugation to obtain an insoluble gel and a soluble sol, and then measuring the refractive indexes of the sol and the gel.

11. The thermoplastic resin composition according to claim 1, wherein the thermoplastic resin composition possesses a haze of 5% or less as measured using an injection specimen having a thickness of 3 mm according to ASTM D1003.

12. The thermoplastic resin composition according to claim 1, wherein the thermoplastic resin composition possesses a gloss of 115 or more as measured at 45° using an injection specimen having a thickness of 3 mm according to ASTM D2457.

13. The thermoplastic resin composition according to claim 1, wherein the thermoplastic resin composition possesses an Izod impact strength of 11 kgf·cm/cm or more as measured at room temperature using a specimen having a thickness of ¼" according to ASTM D256.

14. A molded article, comprising the thermoplastic resin composition according to claim 1.

15. The thermoplastic resin composition according to claim 1, wherein:

the first alkyl (meth)acrylate includes methyl methacrylate, and the first aromatic vinyl compound includes styrene.

16. The thermoplastic resin composition according to claim 1, wherein:

the first alkyl acrylate includes butyl acrylate, and the second aromatic vinyl compound includes styrene.

17. The thermoplastic resin composition according to claim 1, wherein:

the third aromatic vinyl compound includes styrene, the first vinyl cyanide compound includes acrylonitrile, and the second alkyl acrylate includes butyl acrylate.

18. The thermoplastic resin composition according to claim 1, wherein:

the second alkyl (meth)acrylate includes methyl methacrylate, the fourth aromatic vinyl compound includes styrene, the second vinyl cyanide compound includes acrylonitrile, and the imide-based compound includes N-phenylmaleimide.

19. A method of preparing a thermoplastic resin composition, comprising:

kneading and extruding, at 180 to 300° C. and 80 to 400 rpm:

an alkyl (meth)acrylate-aromatic vinyl compound-vinyl cyanide compound graft copolymer (A) comprising:

a polymer seed comprising:

70 to 85% by weight of a first alkyl (meth)acrylate and 15 to 30% by weight of a first aromatic vinyl compound, a rubber core surrounding the polymer seed and comprising:

78 to 90% by weight of a first alkyl acrylate and 10 to 22% by weight of a second aromatic vinyl compound, and a graft shell surrounding the rubber core and comprising:

65 to 80% by weight of a third aromatic vinyl compound, 14 to 25% by weight of a first vinyl cyanide compound, and 3 to 15% by weight of a second alkyl acrylate; and a non-graft copolymer (B) comprising:

a second alkyl (meth)acrylate, a fourth aromatic vinyl compound, a second vinyl cyanide compound, and an imide-based compound, wherein the graft copolymer (A) satisfies both Equations 1 and 2 below:

$$200 \leq 2 \times r2 \leq 300 \quad \text{Equation 1}$$

$$25 \leq r2 - r1 \leq 45, \quad \text{Equation 2}$$

wherein:

r1 represents an average radius (nm) from a center of the graft copolymer to a surface of the polymer seed facing the rubber core, and r2 represents an average radius (nm) from the center of the graft copolymer to a surface of the rubber core facing the graft shell.

20. The method according to claim 19, wherein the kneading and extruding includes kneading and extruding an alkyl acrylate-aromatic vinyl compound-vinyl cyanide compound graft copolymer (C) containing a rubber core having an average particle diameter of 50 to 150 nm, the graft copolymer (A), and the non-graft copolymer (B).

* * * * *